United States Patent
Zhou

(10) Patent No.: US 9,105,945 B2
(45) Date of Patent: Aug. 11, 2015

(54) LITHIUM-ION SOLID BATTERY, AND SYNTHESIS METHOD AND SYNTHESIS DEVICE THEREOF

(71) Applicant: Microvast New Materials (Huzhou) Co., Ltd., Huzhou, Zhejiang (CN)

(72) Inventor: Xiaoping Zhou, Zhejiang (CN)

(73) Assignee: Microvast Power Systems Co., Ltd., Huzhou, Zhejiang (CN)

( * ) Notice: Subject to any disclaimer, the term of this patent is extended or adjusted under 35 U.S.C. 154(b) by 159 days.

(21) Appl. No.: 13/710,425

(22) Filed: Dec. 10, 2012

(65) Prior Publication Data

US 2014/0011069 A1     Jan. 9, 2014

(30) Foreign Application Priority Data

Jul. 6, 2012 (CN) .......................... 2012 1 0234252
Sep. 28, 2012 (CN) .......................... 2012 1 0375947

(51) Int. Cl.
| | |
|---|---|
| H01M 4/26 | (2006.01) |
| H01M 10/058 | (2010.01) |
| H01M 10/0525 | (2010.01) |
| H01M 4/04 | (2006.01) |
| H01M 4/1395 | (2010.01) |
| H01M 10/0585 | (2010.01) |

(52) U.S. Cl.
CPC .......... *H01M 10/058* (2013.01); *H01M 4/0419* (2013.01); *H01M 4/1395* (2013.01); *H01M 10/0525* (2013.01); *H01M 10/0585* (2013.01); *Y02E 60/122* (2013.01)

(58) Field of Classification Search
CPC .......... H01M 10/058; H01M 10/0525; H01M 4/0419; H01M 10/0585; H01M 4/1395; Y02E 60/122
USPC .................................. 29/623.1, 623.3, 623.5
See application file for complete search history.

(56) References Cited

U.S. PATENT DOCUMENTS

| | | | |
|---|---|---|---|
| 2008/0014496 A1* | 1/2008 | Watanabe et al. ............. | 429/129 |
| 2009/0098281 A1* | 4/2009 | Zhang et al. .................... | 427/77 |
| 2011/0168327 A1* | 7/2011 | Oladeji ......................... | 156/278 |

\* cited by examiner

*Primary Examiner* — Jonathan Jelsma
*Assistant Examiner* — Omar Kekia
(74) *Attorney, Agent, or Firm* — Winston Hsu; Scott Margo

(57) ABSTRACT

The present disclosure relates to a lithium-ion solid battery, and a synthesis method and a synthesis device thereof. The synthesis method comprises a synthesis step for a current collector, a synthesis step for a cathode, a synthesis step for a diaphragm and a synthesis step for an anodee, wherein at least one of the steps is accomplished through on-site spray synthesis, and the on-site spray synthesis comprises a process of spraying a molten lithium metal. In the aforesaid way, the manufacturing process flow of the lithium-ion solid battery can be simplified.

15 Claims, 8 Drawing Sheets

LITHIUM-ION SOLID BATTERY, AND SYNTHESIS METHOD AND SYNTHESIS DEVICE THEREOF

FIELD OF THE INVENTION

The present disclosure relates to a lithium-ion solid battery, and a synthesis method and a synthesis device thereof.

BACKGROUND OF THE INVENTION

Lithium-ion batteries feature a high energy density, and rechargeable lithium-ion batteries are reusable and have been used in small apparatuses such as mobile phones and personal computers (PCs) for many years. Furthermore, the rechargeable lithium-ion batteries are possibly used as power supplies of electric vehicles. For a rechargeable lithium-ion battery currently available, except the cathode material and the anode material, the diaphragm and the solvent of the electrolyte solution are all formed of organics. However, the organics are reducing agents and are liable to react with the oxidizing cathode material in a recharging state to generate water and carbon dioxide, and this makes the cycle life of the battery too short to meet the requirement on the power supply of an electromobile. Moreover, the organics will react with oxygen in the air when the battery is destroyed (e.g., in case of an accident), and this may lead to such potential safety hazards as combustion or explosion. Additionally, because the cathode material can oxidize the electrolyte solution, the battery shall not be designed to have a too high voltage (which is generally lower than 4.2 V). Thus, the electric energy that can be stored by the battery in a unit volume is relatively low. By contrast, a solid battery has many advantages. Because the solid battery has no liquid electrolyte solution therein but has a solid electrolyte, the cathode material will not react with other substances even when the cathode material becomes a strong oxidant in the recharging state. Therefore, the solid battery, which features a long cycle life and a high volumetric energy density and a high gravimetric energy density, is safe to use and is capable of operating at a high voltage.

The solid battery is mainly comprised of a cathode material, an anode material and a solid electrolyte diaphragm, in which the solid electrolyte diaphragm is crucial. Because lithium ions have a slower transmission speed in the solid than in the electrolyte solution, it is crucial for the solid battery to research and develop a solid electrolyte material capable of rapidly transmitting lithium ions. The research result of Masahiro et al. (see Solid State Ionics 170: 173-180 (2004)) indicates that, LiSP, LiSiPS, LiGePS or some other compounds having a molecular formula $Li_xM_{1-y}M'_yS_4$ (M=Si, Ge and M'=P, Al, Zn, Ga and Sb) has a lithium-ion-conduction capability similar to that of the electrolyte solution. Seino et al. disclose a solid electrolyte in US Application Publication 2009/0011339A1, which consists of $Li_2S$, $Li_4SiO_4$, $LiBO_3$ and $Li_3PO_4$ and has a good lithium-ion-conduction capability. Trevey et al. (see Electrochemistry Communication 2009, 11(2), 1830-1833) have reported a solid electrolyte prepared by $Li_2S$ and $P_2S_5$, which has a lithium-ion conductance of $2.2\times10^{-3}$ Scm$^{-1}$. In the processes of preparing these solid electrolytes, raw materials are all subjected to ball milling and high-temperature (750° C.) treatment, and are then milled into powders to produce batteries. The batteries need to be treated at a high temperature so that the solid electrolytes are densified. All the preparation processes of the solid electrolytes and the batteries must be carried out under anhydrous conditions. Such solid batteries have a complex manufacturing procedure, a long process flow and a too high manufacturing cost, so they are difficult to be commercialized.

Kugai (see U.S. Pat. No. 6,641,863) discloses a method for preparing a solid electrolyte diaphragm by using a laser to plate a film in the vacuum through vaporization. This method can be used to prepare a film of nano thickness, but has a particularly low speed when being used to prepare a film of micrometer-level thickness. Another shortcoming of the method is that, the method uses a very expensive target and needs to be carried out in the vacuum, which leads to a high manufacturing cost. Therefore, the method is unsuitable for producing lithium-ion batteries.

Oladeji discloses a method for preparing a solid electrolyte in US Applications 2011/0171398A1, 2011/0171528A1 and 2011/0168327A1. The methods comprise: dissolving a raw material in a solvent, and particularly dissolving acetate, sulphate, halide, citrate, nitrate and organic metal compounds of the raw material in water or an organic solvent to prepare a solution; then, spraying the solution onto a surface of a heated substrate to produce a film; under an electric field, spraying lithium ions onto the produced film for lithiation; and then, firing the resulting film at a temperature of 100° C.~500° C. to obtain a solid electrolyte diaphragm. The methods disclosed in these patents are substantially to use aqueous solution to produce composite oxide solid electrolyte diaphragm, and it is difficult to use these methods to produce a lithium-ion metal composite sulfide film. However, in the solid electrolytes reported in the references and disclosed in patents or patent publications currently, the lithium-ion-conduction capability of lithium-ion metal composite sulfide solid electrolytes is higher by 1 to 2 orders of magnitude than that of lithium-ion metal composite oxide electrolytes.

SUMMARY OF THE INVENTION

A primary objective of the present disclosure is to provide a lithium-ion solid battery, and a synthesis method and a synthesis device thereof to simplify the manufacturing process flow of the lithium-ion solid battery.

To achieve the aforesaid objective, the present disclosure provides a synthesis method for a lithium-ion solid battery, which comprises a synthesis step for a current collector, a synthesis step for a cathode, a synthesis step for a diaphragm and a synthesis step for an anode, at least one of which is accomplished through on-site spray synthesis, and the on-site spray synthesis comprises a process of spraying a molten lithium metal.

Preferably, the synthesis step for the current collector comprises: providing a current-collector mixture comprising powders of a metal compound and a liquid dispersant; providing the molten lithium metal; and spraying a spraying jet of the current-collector mixture and a spraying jet of the molten lithium metal onto a substrate simultaneously in a heating state to reduce metal ions in the metal compound into a metallic current collector and to oxidize the lithium metal into a solid electrolyte so as to produce the current collector.

Preferably, the current-collector mixture further comprises a current-collector additive and/or a current-collector adhesive. The current-collector additive is adapted to enhance the electron-conduction capability of the current collector, and the current-collector adhesive is adapted to fix the metallic current collector and the solid electrolyte.

Preferably, the synthesis step for the cathode comprises: providing a cathode material mixture comprising a cathode material, an elemental sulfur and/or phosphorus and a liquid dispersant; providing the molten lithium metal; spraying a spraying jet of the cathode material mixture and a spraying jet of the molten lithium metal onto a substrate simultaneously in a heating state so that the elemental sulfur and/or phosphorus reacts with the lithium metal to generate a solid electrolyte for fixing the cathode material to synthesize the cathode.

Preferably, the cathode material mixture further comprises a cathode additive and/or a cathode conductive agent. The cathode additive is adapted to enhance the lithium-ion-conduction capability of the cathode, and the cathode conductive agent is adapted to enhance the electron-conduction capability of the cathode.

Preferably, the synthesis step for the diaphragm comprises: providing a diaphragm mixture comprising an elemental sulfur and/or phosphorus; providing the molten lithium metal; and spraying a spraying jet of the diaphragm mixture and a spraying jet of the molten lithium metal onto a substrate simultaneously in a heating state so that the elemental sulfur and/or phosphorus reacts with the lithium metal to generate a solid electrolyte so as to synthesize the diaphragm.

Preferably, the diaphragm mixture further comprises a diaphragm additive, and the diaphragm additive reacts with the elemental sulfur and/or phosphorus and the lithium metal to generate a composite lithium-compound solid electrolyte.

Preferably, the synthesis step for the anode comprises: providing an anode material mixture comprising an anode material, an elemental sulfur and/or phosphorus and a liquid dispersant; providing the molten lithium metal; spraying a spraying jet of the anode material mixture and a spraying jet of the molten lithium metal onto a substrate simultaneously in a heating state so that the elemental sulfur and/or phosphorus reacts with the lithium metal to generate a solid electrolyte for fixing the anode material to synthesize the anode.

Preferably, the anode material mixture further comprises an anode additive and/or an anode adhesive. The anode additive reacts with the elemental sulfur and/or phosphorus and the lithium metal to generate a composite lithium-compound solid electrolyte, and the anode adhesive is adapted to fix the anode material, the solid electrolyte or the composite lithium-compound solid electrolyte.

Preferably, the synthesis method further comprises a synthesis step for an end-capping insulation region, which comprises: providing an end-capping mixture comprising an elemental sulfur and/or phosphorus and an end-capping additive; and spraying the end-capping mixture in a molten state onto a region around the current collector to synthesize the end-capping insulation region.

To achieve the aforesaid objective, the present disclosure further provides a lithium-ion solid battery, which is synthesized by the aforesaid synthesis method.

To achieve the aforesaid objective, the present disclosure further provides a synthesis device for a lithium-ion solid battery, which comprises a cathode synthesis device, a diaphragm synthesis device, an anode synthesis device and a current-collector synthesis device, at least one of which operates in a manner of on-site spray synthesis, and the on-site spray synthesis comprises a process of spraying a molten lithium metal.

In this way, the present disclosure synthesizes at least some of components of the lithium-ion solid battery through spraying and on-site chemical reaction, and this simplifies the manufacturing process flow of the lithium-ion solid battery.

Particularly, the process flow of manufacturing a multilayer high-voltage battery is very simple, and is of a high operability.

DETAILED DESCRIPTION OF THE INVENTION

Figure 1:
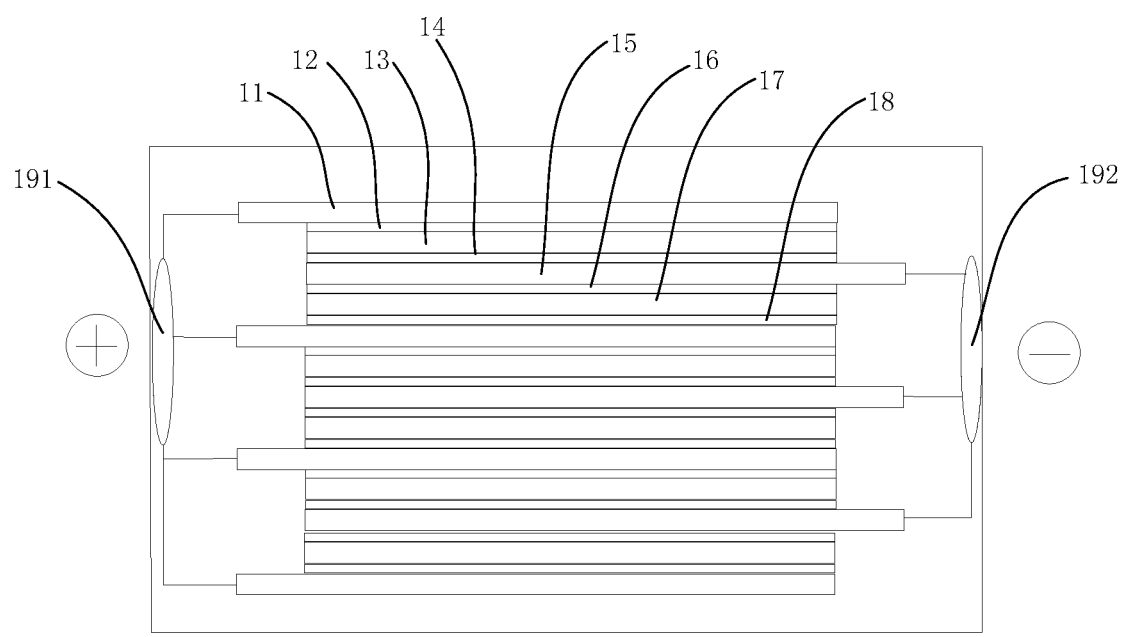
FIG. 1 is a cross-sectional view of a multilayer parallel lithium-ion solid battery according to an embodiment of the present disclosure.

An embodiment of the present disclosure provides a synthesis method for a lithium-ion solid battery, which comprises a synthesis step for a current collector, a synthesis step for a cathode, a synthesis step for a diaphragm and a synthesis step for an anode. At least one of the steps is accomplished through on-site spray synthesis, and the on-site spray synthesis comprises a process of spraying a molten lithium metal. Furthermore, the synthesis method for a lithium-ion solid battery according to the embodiment of the present disclosure further comprises a synthesis step for an end-capping insulation region, which may also be accomplished through on-site spray synthesis.

In a preferred embodiment, the aforesaid steps may all be accomplished through on-site spray synthesis. Specifically, the aforesaid steps may be accomplished in the following way:

a) synthesis of the current collector: providing a current-collector mixture which preferably comprises powders of a metal compound, a current-collector additive, a current-collector adhesive and a liquid dispersant; providing the molten lithium metal; and spraying a spraying jet of the current-collector mixture and a spraying jet of the molten lithium metal onto a substrate simultaneously in a heating state for reaction to synthesize the current collector;

b) synthesis of the cathode: providing a cathode material mixture which preferably comprises a cathode material, an elemental sulfur and/or phosphorus, a cathode additive, a cathode conductive agent and a liquid dispersant; providing the molten lithium metal; and spraying a spraying jet of the cathode material mixture and a spraying jet of the molten lithium metal onto a substrate simultaneously in a heating state for reaction to synthesize the cathode;

c) synthesis of the diaphragm: providing a diaphragm mixture which preferably comprises an elemental sulfur and/or phosphorus and a diaphragm additive; providing the molten lithium metal; and spraying a spraying jet of the diaphragm mixture and a spraying jet of the molten lithium metal onto a substrate simultaneously in a heating state for reaction to synthesize the diaphragm;

d) synthesis of the anode: providing an anode material mixture which preferably comprises an anode material, an elemental sulfur and/or phosphorus, an anode additive, an anode adhesive and a liquid dispersant; providing the molten lithium metal; and spraying a spraying jet of the anode material mixture and a spraying jet of the molten lithium metal onto a substrate simultaneously in a heating state for reaction to synthesize the anode; and e) synthesis of the end-capping insulation region: providing an end-capping mixture which preferably comprises an elemental sulfur and/or phosphorus and an end-capping additive; and spraying the end-capping mixture in a molten state onto a region around the current collector to synthesize the end-capping insulation region.

Hereinbelow, implementation of the aforesaid steps will be described in detail with reference to embodiments.

On-Site Synthesis of the Current Collector

In an embodiment of the present disclosure, on-site synthesis of the current collector comprises the following steps. Powders of a metal compound $M_mX_n$, a current-collector additive, a current-collector adhesive and a liquid dispersant are mixed together to obtain a current-collector mixture, which is then added into a material storage of an atomizer set. Then, the current-collector mixture is stirred and heated, and is controlled at an appropriate temperature, with argon or helium being used as an atomization carrier gas. A lithium metal is added into another material storage and heated to a temperature ranging between 200° C. and 600° C. so that the lithium metal is molten into liquid, with argon or helium being used as an atomization carrier gas. A ceramic or metal plate is provided as a substrate. Then, nozzles of the two material storages are opened to spray a spraying jet of the current-collector mixture and a spraying jet of the molten lithium metal onto the substrate simultaneously for reaction to generate a metallic current collector and $Li_nX$, where $Li_nX$ can be used as a solid electrolyte. The spraying jet of the current-collector mixture is preferably at a temperature ranging between 60° C. and 250° C.

In a preferred embodiment, the powders of the metal compound $M_mX_n$ have a particle size smaller than 200 nm. The chemical reactions occurring here include:

$$M_mX_n + mnLi = nLi_mX + mM \quad (1)$$

In the metal compound $M_mX_n$, M represents a metal ion such as $Cu^{2+}$, $Ag^+$, $Al^{3+}$, $Ni^{2+}$, $Co^{2+}$, $Fe^{2+}$, $Fe^{3+}$, $Cr^{3+}$ or $Mn^{2+}$; and X represents a negative ion such as $S^{2-}$, $Se^{2-}$, $N^{3-}$, $P^{3-}$ or $Si^{4-}$. $M_mX_n$ is preferably at least one selected from $AgS_2$, $Cu_2S$, CuS, $Ni_2P$, $Cu_3N$, $Cu_3P$, $NiSi_2$, $Ni_2Si$, $Ni_3S_2$, CuSe, CuSn, CuTe, $Cu_2Se$ and $Cu_2Te$. Preferably, the metal ion M is $Cu^{2+}$, $Ag^+$ or $Al^{3+}$, and the negative ion X is $S^{2-}$ or $Se^{2-}$. More preferably, the metal ion M is $Cu^{2+}$ or $Al^{3+}$, and the negative ion X is $S^{2-}$.

The current-collector additive comprises a substance capable of enhancing the electron-conduction capability, and is preferably selected from graphite oxide, carbon nanotubes, conductive graphite or graphene, or from carbon nanotubes or graphene plated with Cu, Ag or Au on a surface thereof, or from a mixture thereof.

The liquid dispersant comprises an alkane having a low boiling point, which does not react with the lithium metal and has a molecular formula $C_nH_{2n+2}$ (where n is an integer ranging between 3 and 20). The liquid dispersant may comprise one alkane or a mixture of multiple alkanes.

The current-collector adhesive comprises a polyolefin polymer compound, which does not react with the lithium metal and is dissoluble in the aforesaid liquid dispersant. The current-collector adhesive is used to fix the metallic current collector and the solid electrolyte resulting from the aforesaid reaction. The current-collector adhesive is preferably selected from one or both of a cis-1,4-polybutadiene rubber adhesive and a styrene-butadiene rubber (SBR) adhesive. As will be understood by people skilled in the art, the current-collector additive and the current-collector adhesive are mainly used to enhance the electron-conduction capability and the fixing effect, so they may also be omitted in other embodiments.

During the spray reaction, the sample chamber is filled with argon or helium as a shielding gas. The flow rates are controlled so that the amount of the powders of the metal compound and the amount of the molten lithium metal which are sprayed on the substrate match with each other (Li may moderately exceed by 10% so that the metal compound is fully reduced). Thereby, the desired metal M is generated according to the chemical equation (1). The spraying duration is controlled so that the thickness of the current collector generated meets the requirement. The thickness of the current collector is generally controlled to be between 5 μm and 15 μm.

On-Site Synthesis of the Cathode

In an embodiment of the present disclosure, on-site synthesis of the cathode comprises the following steps. A cathode material, an elemental sulfur and/or phosphorus, a cathode additive, a cathode conductive agent and a liquid dispersant are mixed together to form a cathode material mixture, which is then added into a material storage of an atomizer set and heated until the elemental sulfur and/or phosphorus is molten; and then, a blender is turned on, with argon or helium being used as an atomization carrier gas. Next, a lithium metal is added into another material storage and heated to a temperature ranging between 200° C. and 600° C. so that the lithium metal is molten into liquid; and then a blender is turned on, with argon or helium being used as an atomization carrier gas. A spraying jet of the cathode material mixture and a spraying jet of the molten lithium metal are simultaneously sprayed onto the metallic current collector that is generated through aforesaid spraying process so that the sulfur and/or phosphorus reacts with the lithium metal to generate a solid electrolyte $Li_mS_n$ and/or $Li_xP_y$. Meanwhile, the cathode material is fixed to the current collector to form the cathode. The spraying jet of the cathode material mixture is at a temperature ranging between 60° C. and 250° C.

The cathode material is preferably at least one selected from $LiCoO_2$, $LiMn_2O_4$, $LiFePO_4$, $LiMnPO_4$, $LiVPO_4$ and $LiNi_lCo_mMn_nMa_iMb_jO_2$ (l+m+n+i+j=1). The cathode materials are all solid materials.

The elemental sulfur and/or phosphorus at least has two functions here. One function is that the molten elemental sulfur and/or phosphorus is mixed with the solid cathode material to form a high-temperature slurry having fluidity, which is suitable for producing a film through spraying. The other function is that the elemental sulfur and/or phosphorus at a high temperature and the molten lithium metal will react to generate a solid electrolyte $Li_mS_n$ and/or $Li_xP_y$, when they are mixed on the substrate, and the solid electrolyte $Li_mS_n$ and/or $Li_xP_y$ may also function as an adhesive to fix the cathode material to the substrate. A weight ratio of the elemental phosphorus to the elemental sulfur in the elemental sulfur and/or phosphorus preferably ranges between 0:100 and 60:100 and more preferably ranges between 0:100 and 40:100.

During spraying, the spraying flow rate of the cathode material mixture and the flow rate of the molten lithium metal are controlled so that the reaction proceeds according to equations (2) and (3) in the presence of excessive elemental sulfur and/or phosphorus. The thickness of the cathode material sprayed is controlled by controlling the spraying duration.

$$S+2Li=Li_2S \quad (2)$$

$$P+3Li=Li_3P \quad (3)$$

The cathode additive may be at least one selected from graphite oxide, $P_4S_3$, $P_4S_7$, $P_4S_9$, $P_4S_{10}$, $P_2Se_3$, $P_2S_3$, $Sb_2S_3$, $Sb_2Se_3$, GeSe, GeS, $GeS_2$, $GeSe_2$ and $GeTe_2$. Adding the cathode additive into the cathode material mixture further increases the lithium-ion-conduction capability of the generated solid electrolyte.

The cathode conductive agent is at least one selected from conductive graphite, conductive carbon black and conductive carbon nano-tubes to further increase the electron-conduction capability.

The cathode additive is at least one selected from graphite oxide, $P_4S_3$, $P_4S_7$, $P_4S_9$, $P_4S_{10}$, $P_2Se_3$, $P_2S_3$, $Sb_2S_3$, $Sb_2Se_3$, GeSe, GeS, $GeS_2$, $GeSe_2$ and $GeTe_2$. Adding the cathode additive into the cathode material mixture further increases the lithium-ion-conduction capability of the generated solid electrolyte. The cathode additive can react with the lithium metal on the substrate to generate a composite lithium-compound solid electrolyte. As will be understood by people skilled in the art, the cathode additive and the cathode conductive agent are mainly used to enhance the lithium-ion-conduction capability and the electron-conduction capability, so they may also be omitted in other embodiments.

The liquid dispersant comprises an alkane having a low boiling point, which does not react with the lithium metal and has a molecular formula $C_nH_{2n+2}$ (where n is an integer ranging between 3 and 20). The liquid dispersant may comprise one alkane or a mixture of multiple alkanes.

On-Site Synthesis of the Diaphragm

In an embodiment of the present disclosure, on-site synthesis of the diaphragm comprises the following steps. An elemental sulfur and/or phosphorus and a diaphragm additive are mixed together to form a diaphragm mixture, which is then added into a storage of an atomizer set and heated until the elemental sulfur and/or phosphorus is molten; and then, a blender is turned on, with argon or helium being used as an atomization carrier gas. Next, a lithium metal is added into another material storage and heated to a temperature ranging between 200° C. and 600° C. so that the lithium metal is molten into liquid; and then, a blender is turned on, with argon or helium being used as an atomization carrier gas. A spraying jet of the molten diaphragm mixture and a spraying jet of the molten lithium metal are simultaneously sprayed onto the cathode synthesized as described above (if what synthesized as described above is a anode, the diaphragm may also be sprayed onto the anode). The spraying jet of the diaphragm mixture is at a temperature ranging between 120° C. and 250° C. The molten lithium metal reacts with the molten elemental sulfur and/or phosphorus and the diaphragm additive to generate a corresponding lithium-ion conductor (i.e., a composite lithium-compound solid electrolyte). The lithium-ion conductor serves as a diaphragm between the cathode and the anode of the battery. As will be understood by people skilled in the art, the diaphragm additive is mainly used to enhance the lithium-ion-conduction capability, so it may also be omitted in other embodiments.

The diaphragm additive is at least one selected from $SiS_x$, $GeS_x$ and $P_nS_m$, where x=1 or 2, n=2 or 4, and m=3, 7, 9 or 10.

The lithium-ion conductor is at least one selected from $Li_2S$, $Li_3P$, $LiSi_mS_n$, $LiP_lSi_mS_n$ and $LiGe_nP_lSi_mS_n$.

The equations are as shown by the equations (2), (3), (4), (5) and (6).

Diaphragm spraying is carried out with an atomic-number ratio of S:Li being larger than or equal to 1:1. Here, the atomic number of sulfur is calculated as the total atomic number of the elemental sulfur and the sulfur in the diaphragm additive.

$$Li+mSi+nS==LiSi_mS_n \quad (4)$$

$$Li+1P+mSi+nS==LiP_lSi_mS_n \quad (5)$$

$$Li+hGe+1P+mSi+nS==LiGe_hP_lSi_mS_n \quad (6)$$

On-Site Synthesis of the Anode

In an embodiment of the present disclosure, on-site synthesis of the anode comprises the following steps. An anode material, an elemental sulfur and/or phosphorus, an anode additive, an anode adhesive and a liquid dispersant are mixed together to form an anode material mixture, which is then added into a material storage of an atomizer set and heated until the elemental sulfur and/or phosphorus is molten; and then, a blender is turned on, with nitrogen being used as an atomization carrier gas. Next, a lithium metal is added into another material storage and heated to a temperature ranging between 200° C. and 600° C. so that the lithium metal is molten into liquid; and then, a blender is turned on, with argon being used as an atomization carrier gas. A spraying jet of the anode material mixture and a spraying jet of the molten lithium metal are simultaneously sprayed onto the diaphragm synthesized before to obtain the anode. The spraying jet of the anode material mixture is at a temperature ranging between 60° C. and 250° C.

The anode material is preferably at least one selected from graphite, Si powders, carbon nitride, Sn, and $Li_4Ti_5O_{12}$. In the process of synthesizing the anode, the molten lithium metal reacts with the molten elemental sulfur and/or phosphorus and the anode additive to generate a corresponding lithium-ion conductor (i.e., a composite lithium-compound solid electrolyte). In this reaction, the mol number of the lithium metal is controlled to exceed by 1%~10%. The lithium-ion conductor can be filled in gaps between particles of the anode material to serve as adhesive. The lithium-ion conductor is at least one selected from $Li_2S$, $Li_3P$, $Li_{4m+2n}Si_mS_n$, $Li_{3l+4m+2n}P_lSi_mS_n$ and $Li_{4h+3l+4m+2n}Ge_hP_lSi_mS_n$.

The equations are as shown by the equations (2), (3), and (7) to (17).

$$(4m+2n)Li+mSi+nS==Li_{(4m+2n)}Si_mS_n \quad (7)$$

$$(3l+4m+2n)Li+lP+mSi+nS==Li_{(3l+4m+2n)}P_lSi_mS_n \quad (8)$$

$$(4h+3l+4m+2n)Li+hGe+lP+mSi+nS== \\ Li_{(4h+3l+4m+2n)}Ge_hP_lSi_mS_n \quad (9)$$

$$12Li+P_2S_3==3Li_2S+2Li_3P \quad (10)$$

$$16Li+P_2S_5==5Li_2S+2Li_3P \quad (11)$$

$$12Li+Ga_2S_3==3Li_2S+2Li_3Ga \quad (12)$$

$$6Li+GeSe==Li_2Se+Li_4Ge \quad (13)$$

$$8Li+GeSe_2==2Li_2Se+Li_4Ge \quad (14)$$

$$6Li+GeS==Li_2S+Li_4Ge \quad (15)$$

$$6Li+GeTe==Li_2Te+Li_4Ge \quad (16)$$

$$12Li+Al_2S_3==2Li_3Al+3Li_2S \quad (17)$$

The anode additive is selected from one or more of graphite oxide, $P_4S_3$, $P_4S_7$, $P_4S_9$, $P_4S_{10}$, $P_2Se_3$, $P_2S_3$, $Sb_2S_3$, $Sb_2Se_3$, GeSe, GeS, $GeS_2$, $GeSe_2$ and $GeTe_2$.

The liquid dispersant comprises an alkane having a low boiling point, which does not react with the lithium metal and has a molecular formula $C_nH_{2n+2}$ (where n is an integer ranging between 3 and 20). The liquid dispersant may comprise one alkane or a mixture of multiple alkanes.

The anode adhesive comprises a polyolefin polymer compound, which does not react with the lithium metal and is dissoluble in the aforesaid liquid dispersant. The anode adhesive is used to fix the anode material, the solid electrolyte or the composite lithium-compound solid electrolyte. The anode adhesive is preferably selected from one or both of a cis-1,4-polybutadiene rubber adhesive and a styrene-butadiene rubber (SBR) adhesive. As will be understood by people skilled in the art, the anode additive and the anode adhesive are mainly used to enhance the lithium-ion-conduction capability and the fixing effect, so they may also be omitted in other embodiments.

On-Site Synthesis of the End-Capping Insulation Region

In an embodiment of the present disclosure, On-site synthesis of the end-capping insulation region comprises the following steps. An end-capping mixture comprising an elemental sulfur and/or phosphorus and an end-capping additive is provided. Then, the end-capping mixture in a molten state is sprayed onto a specific region around the current collector to synthesize the end-capping insulation region. A molten spraying jet of the end-capping mixture is at a temperature ranging between 120° C. and 250° C.

The end-capping additive is preferably at least one selected from $P_4S_3$, $P_4S_7$, $P_4S_9$ and $P_4S_{10}$.

Another objective of the present disclosure is to provide a lithium-ion solid battery, which is at least partially accomplished through on-site spray synthesis, and the on-site spray synthesis comprises a process of spraying a molten lithium metal. For example, at least one of a current collector, a cathode, a diaphragm and an anode of the lithium-ion solid battery may be formed through the on-site spray synthesis of the molten lithium metal. Furthermore, an end-capping insulation region of the lithium-ion solid battery may also be formed through on-site spray synthesis. The manufacturing processes of the aforesaid components have been described in detail above and, thus, will not be further described herein.

Additionally, apart from being used to manufacture a monolayer battery, the aforesaid method can further be used to manufacture a multilayer parallel or series lithium-ion solid battery.

As shown in FIG. 1, a multilayer parallel lithium-ion solid battery according to an embodiment of the present disclosure comprises battery units which are stacked in sequence. Each of the battery units comprises a first current collector 11, a first cathode 12, a first diaphragm 13, a first anode 14, a second current collector 15, a second anode 16, a second diaphragm 17, and a second cathode 18 which are stacked together. The first current collectors 11 of the battery units are electrically connected to each other, and the second current collectors 15 of the battery units are electrically connected to each other. A positive terminal 191 and a negative terminal 192 are led out from two sides of the battery respectively. Finally, a plastic packaging material is sprayed onto the exterior of the battery to obtain the multilayer parallel lithium-ion solid battery.

The multilayer parallel lithium-ion solid battery of the present disclosure can be formed, in units of the aforesaid battery units, through M times repeated synthesis processes by the method comprising the aforesaid steps, where M is an integer larger than or equal to 2. According to the above descriptions, the current collectors, the diaphragms, the cathodes and the anodes of the battery units can be directly formed through on-site spray synthesis to synthesize the entire battery.

When the multilayer parallel lithium-ion solid battery is synthesized, operations are the same as what described above except that the first current collector 11 and the second current collector 15 are sprayed to stagger with each other when being viewed from a top view.

Figure 2:
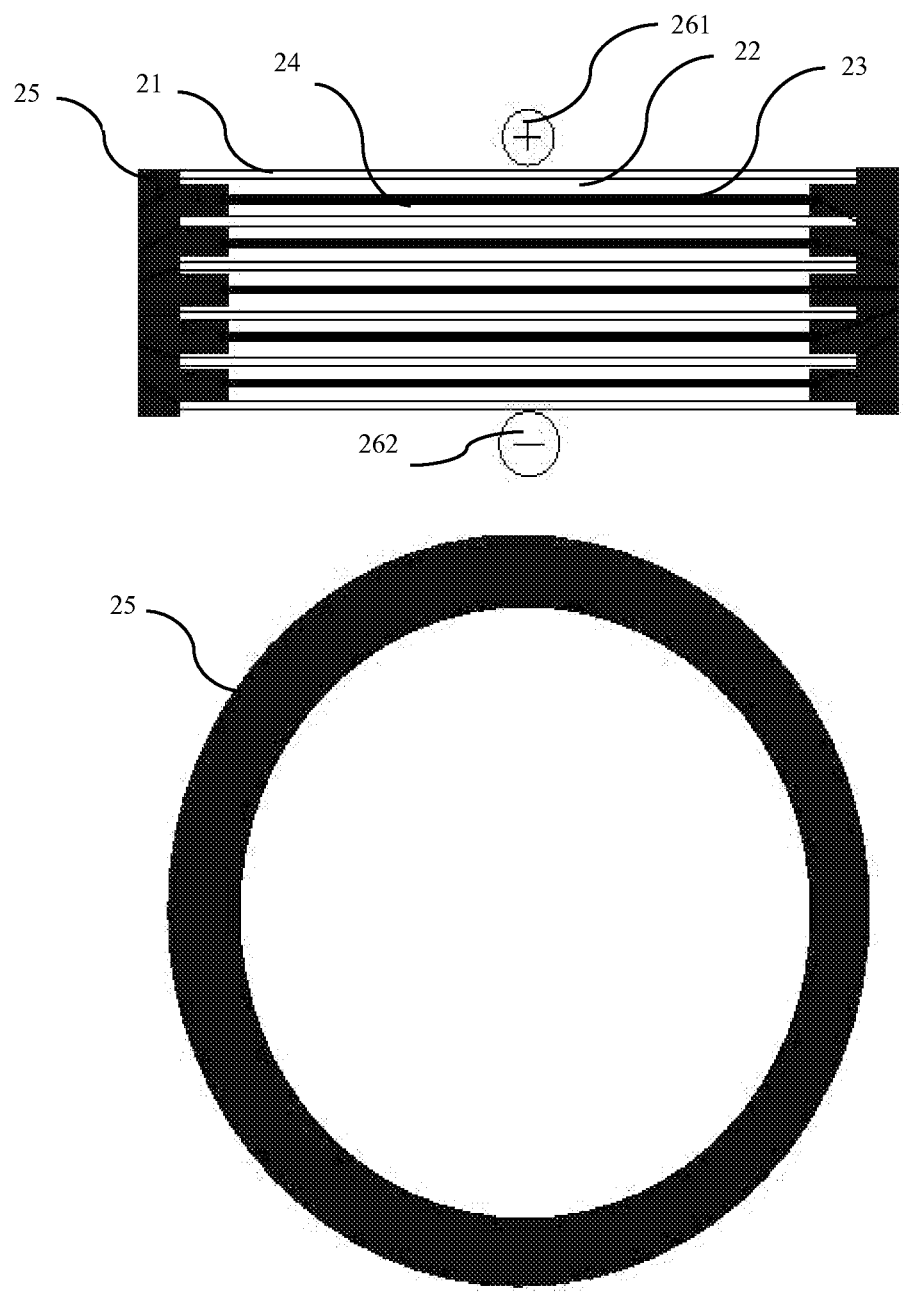
FIG. 2 shows a cross-sectional view and a top view of a multilayer series lithium-ion solid battery according to an embodiment of the present disclosure.
Figure 3:
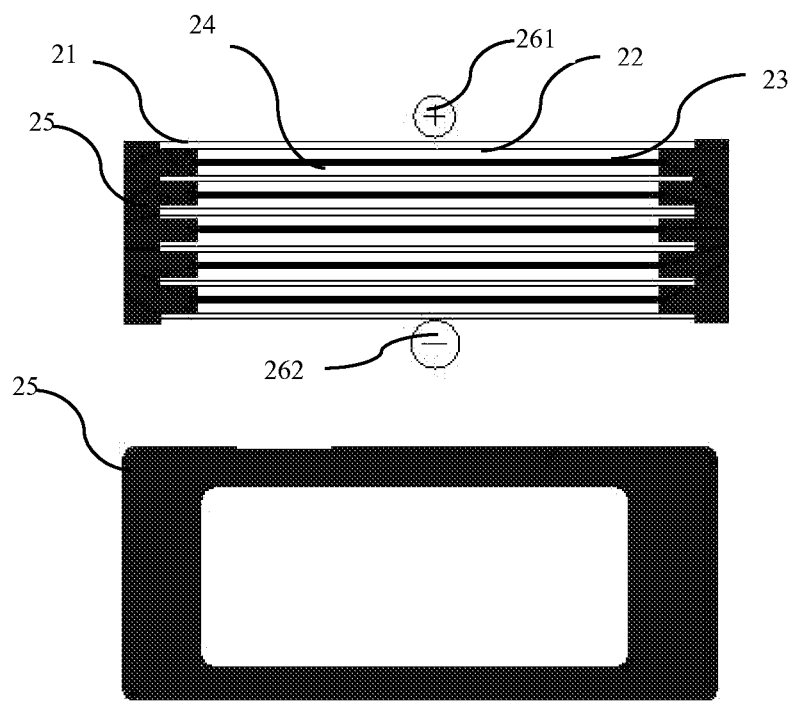
FIG. 3 shows a cross-sectional view and a top view of a multilayer series lithium-ion solid battery according to another embodiment of the present disclosure.

FIG. 2 and FIG. 3 show two different types of multilayer series lithium-ion solid batteries respectively. Specifically, FIG. 2 shows a multilayer series lithium-ion solid battery whose cross section is in the cylindrical form, and FIG. 3 shows a multilayer series lithium-ion solid battery whose cross section is in the cuboid form. The two multilayer series lithium-ion solid batteries each comprise a plurality of battery units stacked together, and each of the battery units comprises a current collector 21, a battery cathode 22, a diaphragm 23, and a battery anode 24 which are stacked in sequence. An end-capping insulation region 25 is further disposed in a region around the current collector 21 to insulate the current collector 21 from the region therearound. The current collectors 21 at two sides of the entire multilayer series lithium-ion solid battery are electrically connected to a positive terminal 261 and a negative terminal 262, which are led out from the two sides of the battery, respectively. Finally, a plastic packaging material is sprayed onto the exterior of the battery to obtain the multilayer series lithium-ion solid battery.

The multilayer series lithium-ion solid battery of the present disclosure can be formed, in units of the aforesaid battery units, through N times repeated synthesis processes by the method comprising the aforesaid steps, where N is an integer larger than or equal to 2. According to the above descriptions, the current collectors, the diaphragms, the cathodes and the anodes of the battery units can be directly formed through on-site spray synthesis to synthesize the entire battery. When the multilayer series battery is synthesized, a material that is insulative for electrons and lithium ions needs to be sprayed in advance on the region around each of the current collectors for use as an end-capping insulation region (e.g., P or $P_nS_m$ molten in S). The width of the end-capping insulation region sprayed shall cover an edge of the current collector by 1 millimeter (mm) to 10 mm. After the metallic current collector is sprayed, the end-capping insulation region needs to be sprayed again around the metallic current collector.

After the designed number of layers of battery units of the multilayer parallel lithium-ion solid battery or the multilayer series lithium-ion solid battery are synthesized, a protective plastic layer is sprayed onto the exterior of the battery or the battery is encapsulated into a packaging material to complete synthesis of the battery.

Hereinbelow, preferred embodiments of the present disclosure will be described in detail by taking the multilayer parallel lithium-ion solid battery and the multilayer series lithium-ion solid battery as examples.

Embodiment 1

On-Site Synthesis of the Multilayer Parallel Battery

Figure 4:
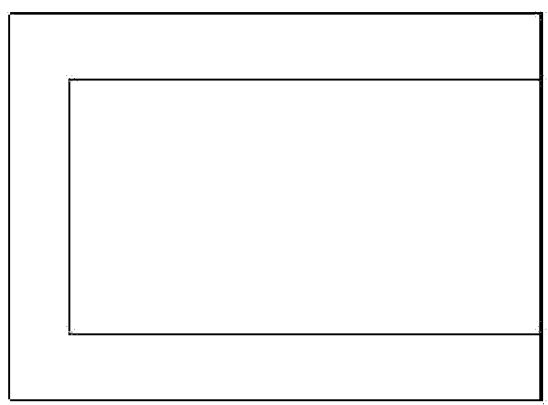
FIG. 4 is a schematic view illustrating a spraying range of a current collector according to an embodiment of the present disclosure.

Step A. synthesis of the first current collector: a 3.0 mm×100 mm×100 mm ceramic plate having a sanded surface is used as a substrate material. 40.0 g of a nano material (which has a particle size smaller than 100 nm) comprising 90 wt % of $Cu_2S$ and 10 wt % of $Ag_2S$, 1.00 g of graphene, 1.60 g of a cis-1,4-polybutadiene rubber adhesive, and 200.0 g of n-hexane are mixed together to obtain a current-collector mixture, which is then added into a material storage of a current-collector atomizer set. The material storage is closed, the current-collector mixture is stirred and heated with the temperature being controlled at 100° C., and argon is used as an atomization carrier gas. Then, 100.0 g of the lithium metal is added into another material storage and is heated to 400° C., with argon being used as an atomization carrier gas. Next, two nozzles are opened to spray the current-collector mixture and the lithium metal onto the substrate simultaneously. As shown in FIG. 4, the spraying range is a range enclosed by an inner frame, and an upper side, a lower side and a left side of the inner frame all have a distance of 10 mm from those of an outer frame respectively. The spraying flow rate and the spraying speed are controlled so that the mol number of Li is equal to a sum of the mol number of Cu and the mol number of Ag, and the spray thickness is controlled to be 15 μm.

Figure 5:
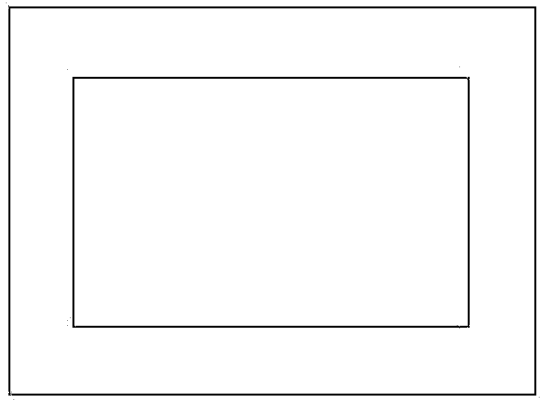
FIG. 5 is a schematic view illustrating a spraying range of a cathode according to an embodiment of the present disclosure.

Step B. on-site synthesis of the first cathode: 40.0 g of $LiCoO_2$ (which has a particle size smaller than 200 nm), 2.00 g of sulfur and 0.50 g of elemental white phosphorus, 0.60 g of $P_2S_5$, 2.00 g of conductive carbon black and 100.0 g of n-hexane are mixed together to obtain a cathode material mixture, which is then transferred into a storage of an atomizer and is heated to 160° C. Then, a blender is turned on, with argon being used as an atomization carrier gas. The lithium metal is added into another material storage and heated to 400° C., and then a blender is turned on, with argon being used as an atomization carrier gas. The cathode material mixture and the lithium metal are simultaneously sprayed onto the first current collector that has been sprayed before. As shown in FIG. 5, the spraying range is a range enclosed by an inner frame, and an upper side, a lower side and a left side of the inner frame all have a distance of 10 mm from those of an outer frame respectively. The spraying flow rate and the spraying speed are controlled so that the mol number of Li is equal to 0.8 times a sum of the mol number of sulfur and the mol number of phosphorus, and the spray thickness is controlled to be 40 μm.

Figure 6:
FIG. 6 is a schematic view illustrating a spraying range of a diaphragm according to an embodiment of the present disclosure.

Step C. on-site synthesis of the first diaphragm: 50.0 g of sulfur, 10.0 g of $P_2S_5$ and 1.0 g of $GeS_2$ are mixed together to form a diaphragm mixture, which is then transferred into a storage of a diaphragm atomizer and is heated to 120° C. Then, a blender is turned on, with argon being used as an atomization carrier gas. The lithium metal is added into another material storage and heated to 400° C., and then a blender is turned on, with argon being used as an atomization carrier gas. The molten diaphragm mixture and the lithium metal are simultaneously sprayed onto the cathode that has been sprayed before. As shown in FIG. 6, the spraying range is a range enclosed by a left frame, and a right edge of the frame has a distance of 5 mm from that of the cathode. When the diaphragm is sprayed, the mol ratio of S:Li is equal to 2:1, and the spray thickness is controlled to be 10 μm.

Figure 7:
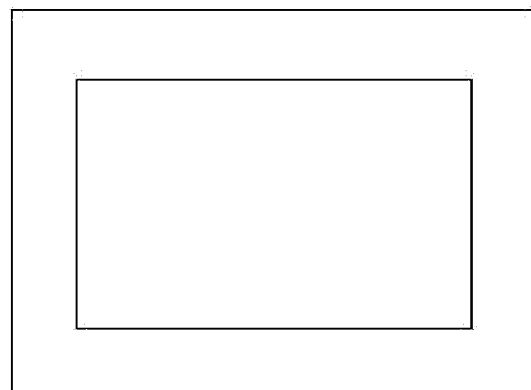
FIG. 7 is a schematic view illustrating a spraying range of an anode according to an embodiment of the present disclosure.

Step D. on-site synthesis of the first anode: 50.0 g of $Li_4Ti_5O_{12}$ (which has a particle size smaller than 100 nm), 2.50 g of conductive carbon black, 4.0 g of elemental sulfur, 2.0 g of elemental white phosphorus, 0.50 g of GeSe, 2.50 g of a cis-1,4-polybutadiene rubber adhesive and 200.0 g of n-hexane are mixed together to form an anode material mixture, which is then transferred into a material storage of an atomizer and is heated to 120° C. Then, a blender is turned on, with argon being used as an atomization carrier gas. The lithium metal is added into another material storage and heated to 500° C., and then a blender is turned on, with argon being used as an atomization carrier gas. The anode material mixture and the lithium metal are sprayed onto the first diaphragm, which has been synthesized before, simultaneously to obtain the first anode. As shown in FIG. 7, the spraying range is a range enclosed by an inner frame, and edges of the inner frame all have a distance of 10 mm from those of an outer frame respectively. In the process of synthesizing the first anode, the mol ratios of Li to S, P, Ge and Se are controlled in such a way that the lithium metal exceeds by 5.0% after $Li_2S$, $Li_3P$, $Li_4Ge$ and $Li_2Se$ are generated, and the spray thickness is controlled to be 30 μm.

Figure 8:
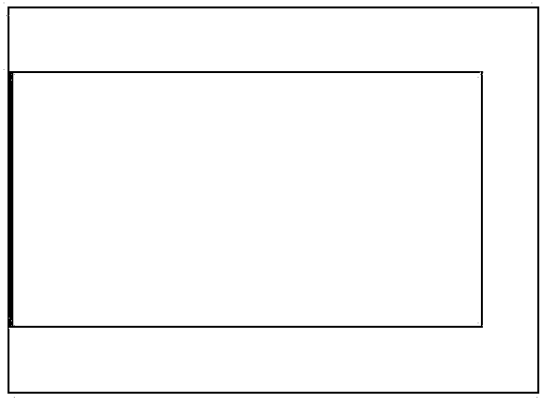
FIG. 8 is a schematic view illustrating a spraying range of a current collector according to an embodiment of the present disclosure.

Step E. synthesis of the second current collector: 40.0 g of a nano material (which has a particle size smaller than 100 nm) comprising 90 wt % of $Cu_2S$ and 10 wt % of $Ag_2S$, 1.00 g of graphene, 1.60 g of a cis-1,4-polybutadiene rubber adhesive, and 200.0 g of n-hexane are mixed together to obtain a current-collector mixture. The current-collector mixture is added into a material storage of a current-collector atomizer set, and the material storage is closed. The current-collector mixture is stirred and heated with the temperature being controlled at 100° C., and argon is used as an atomization carrier gas. The lithium metal is added into another material storage and heated to 400° C., with argon being used as an atomization carrier gas. Two nozzles are opened to spray the current-collector mixture and the lithium metal onto the substrate simultaneously. As shown in FIG. 8, the spraying range is a range enclosed by an inner frame, and an upper edge, a lower edge and a right edge of the inner frame all have a distance of 10 mm from those of an outer frame respectively. The spraying flow rate and the spraying speed are controlled so that the mol number of Li is equal to a sum of the mol number of Cu and the mol number of Ag, and the spray thickness is controlled to be 15 μm.

Step F. on-site synthesis of the second anode: the procedure of the step D is repeated to spray the second anode on the second current collector.

Figure 9:
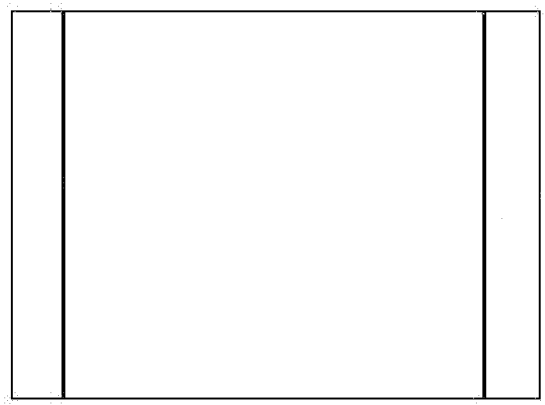
FIG. 9 is a schematic view illustrating a spraying range of a diaphragm according to an embodiment of the present disclosure.

Step G. on-site synthesis of the second diaphragm: on the basis of the step F, the procedure of the step C is repeated to spray the second diaphragm. As shown in FIG. 9, the spraying range is a range enclosed by a middle frame, and a left edge and a right edge of the middle frame both have a distance of 5 mm from those of an outer frame respectively.

Step H. on-site synthesis of the second cathode: the procedure of the step B is repeated to spray the second cathode.

On the above basis, the procedures of the step A to the step H are repeated for 99 times according to the construction of FIG. 1. The procedure of the step A is repeated on the second cathode, which is finally formed, to synthesize the first current collector. Then, a polyethylene plastic is sprayed on the outermost layer to obtain a multilayer parallel lithium-ion solid battery which has a voltage of 2.4 V.

Embodiment 2

On-Site Synthesis of the Multilayer Series Battery

A 3.0 mm×100 mm×100 mm Al plate having a sanded surface is used as a substrate material.

Figure 10:
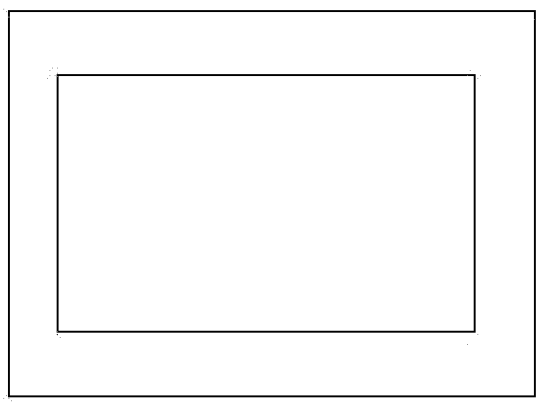
FIG. 10 is a schematic view illustrating a spraying range of a cathode according to an embodiment of the present disclosure.

Step J. on-site synthesis of the cathode: 40.0 g of $LiCoO_2$ (which has a particle size smaller than 200 nm), 5.00 g of sulfur and 0.50 g of elemental white phosphorus, 0.60 g of $P_2S_5$, 2.00 g of conductive carbon black and 100.0 g of n-hexane are mixed together to obtain a cathode material mixture, which is then transferred into a storage of an atomizer and is heated to 160° C. Then, a blender is turned on, with argon being used as an atomization carrier gas. The lithium metal is added into another material storage and heated to 400° C., and then a blender is turned on, with argon being used as an atomization carrier gas. The cathode material mixture and the lithium metal are simultaneously sprayed onto the current collector that has been sprayed before. The spraying flow rate and the spraying speed are controlled so that the mol number of Li is equal to 0.8 times a sum of the mol number of sulfur and the mol number of phosphorus, and the spray thickness is controlled to be 40 μm. As shown in FIG. 10, the spraying range is a range enclosed by an inner frame, and edges of the inner frame all have a distance of 5 mm from those of an outer frame respectively.

Figure 11:
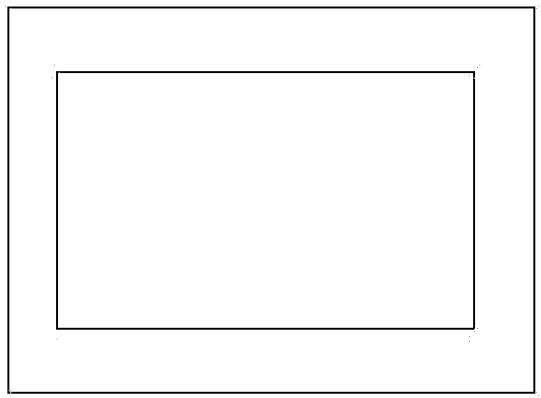
FIG. 11 is a schematic view illustrating a spraying range of an end-capping insulation region according to an embodiment of the present disclosure.

Step K. spraying of the end-capping insulation region: 50.0 g of sulfur and 10.0 g of $P_4S_5$ are mixed together to obtain an end-capping mixture, which is then transferred into a storage of an atomizer and is heated to 160° C. Then, a blender is turned on, with argon being used as an atomization carrier gas. The end-capping insulation region is sprayed onto the cathode, which has been sprayed before, according to FIG. 11, with the spray thickness being controlled to be 15 μm. The spraying range is an annular portion between an inner frame and an outer frame as shown in FIG. 11, and edges of the inner frame all have a distance of 10 mm from those of the outer frame respectively.

Figure 12:
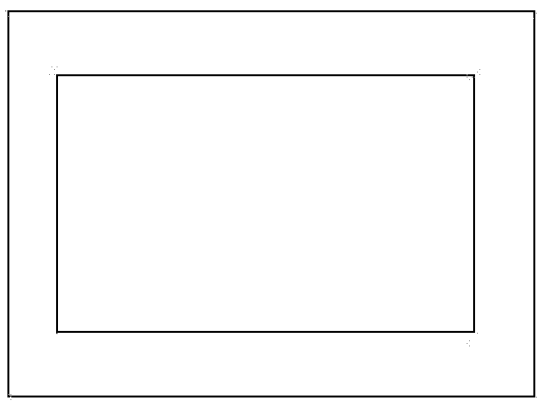
FIG. 12 is a schematic view illustrating a spraying range of a diaphragm according to an embodiment of the present disclosure.

Step L. on-site synthesis of the diaphragm: 50.0 g of sulfur, 10.0 g of $P_2S_5$ and 1.0 g of $GeS_2$ are mixed together to form a diaphragm mixture, which is then transferred into a storage of a diaphragm atomizer and is heated to 120° C. Then, a blender is turned on, with argon being used as an atomization carrier gas. The lithium metal is added into another material storage and heated to 400° C., and then a blender is turned on, with argon being used as an atomization carrier gas. The molten diaphragm mixture and the lithium metal are simultaneously sprayed onto the cathode that has been sprayed before. In spraying of the diaphragm, the mol ratio of S:Li is equal to 2:1, and the spray thickness is controlled to be 15 μm. The spraying is carried out according to FIG. 12, and the spraying range is a range enclosed by an inner frame, with edges of the inner frame all having a distance of 10 mm from those of an outer frame respectively.

Figure 13:
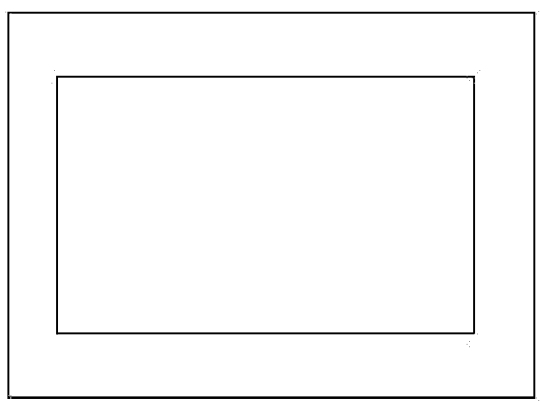
FIG. 13 is a schematic view illustrating a spraying range of an anode according to an embodiment of the present disclosure.

Step M. on-site synthesis of the anode: 50.0 g of $Li_4Ti_5O_{12}$ (which has a particle size smaller than 100 nm), 2.50 g of conductive carbon black, 5.0 g of elemental sulfur, 2.0 g of $P_2S_5$, 0.50 g of GeSe, 2.50 g of a cis-1,4-polybutadiene rubber adhesive and 200.0 g of n-hexane are mixed together to form an anode material mixture, which is then transferred into a storage of an atomizer and is heated to 120° C. Then, a blender is turned on, with argon being used as an atomization carrier gas. The lithium metal is added into another material storage and heated to 500° C., and then a blender is turned on, with argon being used as an atomization carrier gas. The anode material mixture and the lithium metal are simultaneously sprayed onto the solid electrolyte diaphragm, which has been synthesized before, to obtain the anode. In the process of synthesizing the anode, the mol ratios of Li to S, P, Ge and Se are controlled in such a way that the lithium metal exceeds by 5.0% after $Li_2S$, $Li_3P$, $Li_4Ge$ and $Li_2Se$ are generated, and the spray thickness is controlled to be 30 μm. Spraying is carried out according to FIG. 13, and the spraying range is a range enclosed by an inner frame, with edges of the inner frame all having a distance of 5 mm from those of an outer frame respectively.

Figure 14:
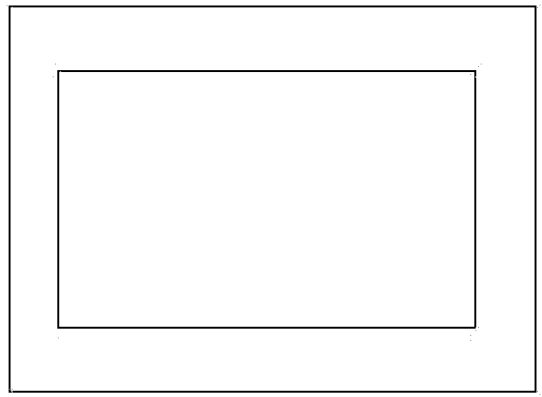
FIG. 14 is a schematic view illustrating a spraying range of a current collector according to an embodiment of the present disclosure.

Step N. synthesis of the current collector: 40.0 g of a nano material (which has a particle size smaller than 100 nm) comprising 90 wt % of $Cu_2S$ and 10 wt % of $Ag_2S$, 1.00 g of graphene, 1.60 g of a styrene-butadiene rubber adhesive, and 200.0 g of n-hexane are mixed together to obtain a current-collector mixture. The current-collector mixture is added into a material storage of a current-collector atomizer set, and the material storage is closed. The current-collector mixture is stirred and heated with the temperature being controlled at 100° C., and argon is used as an atomization carrier gas. The lithium metal is added into another material storage and heated to 400° C., with argon being used as an atomization carrier gas. Two nozzles are opened to spray the current-collector mixture and the lithium metal onto the substrate simultaneously. The spraying flow rate and the spraying speed are controlled so that the mol number of Li is equal to a sum of the mol number of Cu and the mol number of Ag, and the spray thickness is controlled to be 20 μm. Spraying is carried out according to FIG. 14, and the spraying range is a range enclosed by an inner frame, with edges of the inner frame all having a distance of 5 mm from those of an outer frame respectively.

Figure 15:
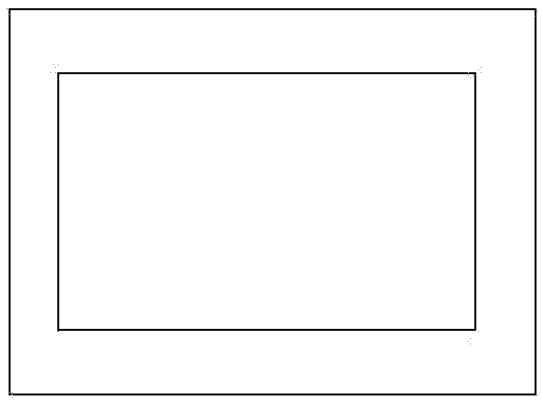
FIG. 15 is a schematic view illustrating a spraying range of an end-capping insulation region according to an embodiment of the present disclosure.

Step O. spraying of the end-capping insulation region: 50.0 g of sulfur, 2.0 g of elemental white phosphorus and 10.0 g of $P_4S_5$ are mixed together to obtain an end-capping mixture, which is then transferred into a storage of an atomizer and is heated to 160° C. Then, a blender is turned on, with argon being used as an atomization carrier gas. The end-capping insulation region is sprayed, according to FIG. 15, onto the anode which has been sprayed before, with the spray thickness being controlled to be 15 μm. The spraying range is an annular portion between an inner frame and an outer frame as shown in FIG. 15, and edges of the inner frame all have a distance of 10 mm from those of the outer frame respectively.

Figure 16:
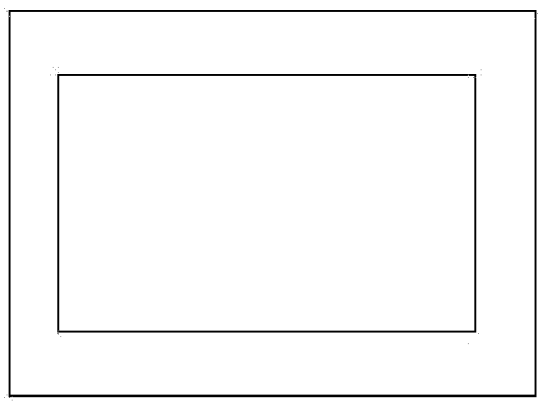
FIG. 16 is a schematic view illustrating a spraying range of a cathode according to an embodiment of the present disclosure.

Step P. on-site synthesis of the cathode: 40.0 g of $LiCoO_2$ (which has a particle size smaller than 200 nm), 4.00 g of sulfur, 0.60 g of $P_2S_5$, 2.00 g of conductive carbon black and 100.0 g of n-hexane are mixed together to obtain a cathode material mixture, which is then transferred into a storage of an atomizer and is heated to 160° C. Then, a blender is turned on, with argon being used as an atomization carrier gas. The lithium metal is added into another material storage and heated to 400° C., and then a blender is turned on, with argon being used as an atomization carrier gas. The cathode material mixture and the lithium metal are simultaneously sprayed onto the current collector that has been sprayed before. The spraying flow rate and the spraying speed are controlled so that the mol number of Li is equal to 0.8 times a sum of the mol number of sulfur and the mol number of phosphorus, and the spray thickness is controlled to be 40 μm. The spray portion is as shown in FIG. 16, and the spraying range is a range enclosed by an inner frame, with edges of the inner frame all having a distance of 5 mm from those of an outer frame respectively.

On the above basis, the spraying procedures are repeated for 99 times in the sequence of K-L-M-N-O-P-. Moreover, after the current collector is sprayed on the anode of the last layer, a polyethylene plastic is sprayed on the outermost layer to obtain a multilayer series lithium-ion solid battery, which has a thickness of about 1.5 cm and a voltage of 240 V.

Figure 17:
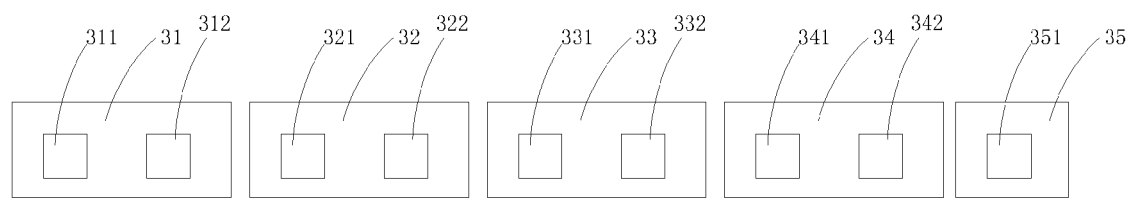
FIG. 17 is a schematic view of a synthesis device for a lithium-ion solid battery according to an embodiment of the present disclosure.

A further objective of the present disclosure is to provide a synthesis device for a lithium-ion solid battery. As shown in FIG. 17, the synthesis device comprises a cathode synthesis device 31, a diaphragm synthesis device 32, an anode synthesis device 33 and a current-collector synthesis device 34. At least one of the devices 31, 32, 33, 34 operates in a manner of on-site spray synthesis, and the on-site spray synthesis comprises a process of spraying a molten lithium metal. In a preferred embodiment, the devices 31, 32, 33, 34 are a set of cathode atomizers, a set of diaphragm atomizers, a set of anode atomizers and a set of current-collector atomizers respectively (if necessary, a cathode current-collector atomizer and an anode current-collector atomizer may be disposed respectively). The cathode synthesis device 31 comprises at least two sets of nozzles 311, 312; the diaphragm synthesis device 32 comprises at least two sets of nozzles 321, 322; the anode synthesis device 33 comprises at least two sets of nozzles 331, 332; and the current-collector synthesis device 34 comprises at least two sets of nozzles 341, 342. The nozzles 311, 321, 331, 341 are used to spray the molten lithium metal; and the nozzles 312, 322, 332, 342 are used to spray the cathode material mixture, the diaphragm mixture, the anode material mixture, and the current-collector mixture, which are described above, respectively. The nozzles 311, 321, 331, 341 and the nozzles 312, 322, 332, 342 can aim at to-be-sprayed objects, which are fixed on a worktable, to form a cathode, a diaphragm, an anode and a current collector through on-site spray synthesis in the way described above respectively. The cathode synthesis device 31, the diaphragm synthesis device 32, the anode synthesis device 33 and the current-collector synthesis device 34 have their respective material storages capable of heating and stirring and have their respective carrier-gas control pipelines. Each of the nozzles is installed in a working chamber where the atmosphere can be controlled. All of the spraying flow rates, the spraying durations and temperatures can be program-controlled.

Further, the synthesis device for a lithium-ion solid battery according to the embodiment of the present disclosure further comprises an end-capping-insulation-region synthesis device 35. The end-capping-insulation-region synthesis device 35 comprises a nozzle 351, which is adapted to spray the end-capping mixture described above to form an end-capping insulation region through on-site spray synthesis.

What described above are only some of the preferred embodiments of the present disclosure, but are not intended to limit the present disclosure in any form. Although the present disclosure has been described above with reference to the preferred embodiments thereof, the preferred embodiments are not intended to limit the present disclosure. People skilled in the art can make slight alterations or modifications as equivalent embodiments on the basis of the above disclosures without departing from the scope of the present disclosure. However, any alterations, equivalent changes and modifications made to the above embodiments according to the technical spirits of the present disclosure and without departing from the scope of the present disclosure shall all be covered within the scope of the present disclosure.

What is claimed is:

1. A synthesis method for a lithium-ion solid battery, comprising a synthesis step for a current collector, a synthesis step for a cathode, a synthesis step for a diaphragm and a synthesis step for an anode, wherein the synthesis step for the current collector comprises: providing a current-collector mixture comprising powders of a metal compound and a liquid dispersant; providing a molten lithium metal; and spraying a spraying jet of the current-collector mixture and a spraying jet of the molten lithium metal onto a substrate simultaneously in a heating state to reduce metal ions in the metal compound into a metallic current collector and to oxidize the lithium metal into a solid electrolyte so as to produce the current collector.

2. The synthesis method for a lithium-ion solid battery of claim 1, wherein the molten lithium metal is at a temperature ranging between 200° C. and 600° C.

3. The synthesis method for a lithium-ion solid battery of claim 1, wherein the current-collector mixture further comprises a current-collector additive and/or a current-collector adhesive, the current-collector additive is adapted to enhance the electron-conduction capability of the current collector, and the current-collector adhesive is adapted to fix the metallic current collector and the solid electrolyte.

4. The synthesis method for a lithium-ion solid battery of claim 1, wherein the metal compound is a compound formed by metal ions M and negative ions X, the metal ions M are at least one selected from $Cu^{2+}$, $Ag^+$, $Al^{3+}$, $Ni^{2+}$, $Co^{2+}$, $Fe^{2+}$, $Fe^{3+}$, $Cr^{3+}$ and $Mn^{2+}$, and the negative ions X are at least one selected from $S^{2-}$, $Se^{2-}$, $N^{3-}$, $P^{3-}$ and $S^{4-}$.

5. The synthesis method for a lithium-ion solid battery of claim 1, wherein the synthesis step for the cathode comprises: providing a cathode material mixture comprising a cathode material, an elemental sulfur and/or phosphorus and a liquid dispersant; providing the molten lithium metal; spraying a spraying jet of the cathode material mixture and a spraying jet of the molten lithium metal onto a substrate simultaneously in a heating state so that the elemental sulfur and/or phosphorus reacts with the lithium metal to generate a solid electrolyte for fixing the cathode material to synthesize the cathode.

6. The synthesis method for a lithium-ion solid battery of claim 5, wherein the cathode material mixture further comprises a cathode additive and/or a cathode conductive agent, the cathode additive is adapted to enhance the lithium-ion-conduction capability of the cathode, and the cathode conductive agent is adapted to enhance the electron-conduction capability of the cathode.

7. The synthesis method for a lithium-ion solid battery of claim 5, wherein the cathode material is at least one selected from $LiCoO_2$, $LiMn_2O_4$, $LiFePO_4$, $LiMnPO_4$, and $LiVPO_4$.

8. The synthesis method for a lithium-ion solid battery of claim 5, wherein the elemental sulfur and/or phosphorus has a weight ratio of an elemental phosphorus to an elemental sulfur between 0:100 and 60:100.

9. The synthesis method for a lithium-ion solid battery of claim 1, wherein the synthesis step for the diaphragm comprises: providing a diaphragm mixture comprising an elemental sulfur and/or phosphorus; providing the molten lithium metal; and spraying a spraying jet of the diaphragm mixture and a spraying jet of the molten lithium metal onto a substrate simultaneously in a heating state so that the elemental sulfur and/or phosphorus reacts with the lithium metal to generate a solid electrolyte so as to synthesize the diaphragm.

10. The synthesis method for a lithium-ion solid battery of claim 9, wherein the diaphragm mixture further comprises a diaphragm additive, and the diaphragm additive reacts with the elemental sulfur and/or phosphorus and the lithium metal to generate a composite lithium-compound solid electrolyte.

11. The synthesis method for a lithium-ion solid battery of claim 10, wherein the diaphragm additive is at least one selected from $SiS_x$, $GeS_x$ and $P_nS_m$, where x=1 or 2, n=2 or 4, and m=3, 7, 9 or 10.

12. The synthesis method for a lithium-ion solid battery of claim 1, wherein the synthesis step for the anode comprises: providing an anode material mixture comprising an anode material, an elemental sulfur and/or phosphorus and a liquid dispersant; providing the molten lithium metal; spraying a spraying jet of the anode material mixture and a spraying jet of the molten lithium metal onto a substrate simultaneously in a heating state so that the elemental sulfur and/or phosphorus reacts with the lithium metal to generate a solid electrolyte for fixing the anode material to synthesize the anode.

13. The synthesis method for a lithium-ion solid battery of claim 12, wherein the anode material mixture further comprises an anode additive and/or an anode adhesive, the anode additive reacts with the elemental sulfur and/or phosphorus and the lithium metal to generate a composite lithium-compound solid electrolyte, and the anode adhesive is adapted to fix the anode material, the solid electrolyte or the composite lithium-compound solid electrolyte.

14. The synthesis method for a lithium-ion solid battery of claim 1, further comprising a synthesis step for an end-capping insulation region, wherein the synthesis step for the end-capping insulation region comprises: providing an end-capping mixture comprising an elemental sulfur and/or phosphorus and an end-capping additive; and spraying the end-capping mixture in a molten state onto a region around the current collector to synthesize the end-capping insulation region.

15. The synthesis method for a lithium-ion solid battery of claim 14, wherein the end-capping additive is at least one selected from $P_4S_3$, $P_4S_7$, $P_4S_9$ and $P_4S_{10}$.

* * * * *